(12) United States Patent
Zheng et al.

(10) Patent No.: US 10,370,264 B2
(45) Date of Patent: *Aug. 6, 2019

(54) SYSTEM AND METHOD TO DESALINATE A FEED WATER STREAM BY MIXING THE FEED WATER STREAM WITH A HEATING MEDIUM

(71) Applicant: Cameron Solutions, Inc., Houston, TX (US)

(72) Inventors: Z. Frank Zheng, Cypress, TX (US); Christopher Stephen King, Houston, TX (US); Harihara V. Nemmara, Katy, TX (US)

(73) Assignee: Cameron Solutions, Inc., Houston, TX (US)

( * ) Notice: Subject to any disclaimer, the term of this patent is extended or adjusted under 35 U.S.C. 154(b) by 229 days.

This patent is subject to a terminal disclaimer.

(21) Appl. No.: 15/193,771

(22) Filed: Jun. 27, 2016

(65) Prior Publication Data

US 2017/0368470 A1 Dec. 28, 2017

(51) Int. Cl.
*B01D 1/14* (2006.01)
*C02F 1/10* (2006.01)
(Continued)

(52) U.S. Cl.
CPC ............ *C02F 1/10* (2013.01); *B01D 1/0064* (2013.01); *B01D 1/0094* (2013.01); *B01D 1/14* (2013.01); *B01D 1/2856* (2013.01); *B01D 5/006* (2013.01); *C02F 1/041* (2013.01); *C02F 2103/08* (2013.01); *Y02A 20/128* (2018.01)

(58) Field of Classification Search
CPC .. B01D 1/0041; B01D 1/0064; B01D 1/0094; B01D 5/006; C02F 1/10; C02F 2103/08
See application file for complete search history.

(56) References Cited

U.S. PATENT DOCUMENTS 3,181,600 A 5/1965 Woodward et al.
8,652,304 B2 2/2014 Nazzer

FOREIGN PATENT DOCUMENTS

DE 2346609 3/1975
GB 1262458 2/1972
WO 2007073204 A1 6/2007

OTHER PUBLICATIONS

Perry's Chemical Engineer's Handbook, 2008, 8th ed., McGraw-Hill, p. 13-5.*
(Continued)

*Primary Examiner* — Renee Robinson
*Assistant Examiner* — Derek N Mueller
(74) *Attorney, Agent, or Firm* — Hauptman Ham, LLP

(57) ABSTRACT

A system and method to desalinate a feed water stream does so in a liquid pool zone of a vessel as the stream comes into contact with a heating medium that is less volatile than the feed water stream. To keep the pool hot, the heating medium can be recirculated through a heater of a pump-around loop or a heater can be placed in the liquid pool. As the feed water stream is vaporized or partially vaporized, any solids and unvaporized water present in the feed water stream come out of the stream and move into the heating medium. These solids and unvaporized water may be further removed from the heating medium in the pool or in the pump-around loop. The heat exchange surface does not contact the feed water.

23 Claims, 3 Drawing Sheets

(51) Int. Cl.
*B01D 1/00* (2006.01)
*B01D 5/00* (2006.01)
*B01D 1/28* (2006.01)
*C02F 1/04* (2006.01)
*C02F 103/08* (2006.01)

(56) References Cited

OTHER PUBLICATIONS

GE, Water and Process Technology, 2012, (retrieved Mar. 30, 2018).*
Detlef Gille, Seawater intakes for desalination plants, 2003, Desalination, vol. 156, pp. 249-256.*

\* cited by examiner

SYSTEM AND METHOD TO DESALINATE A FEED WATER STREAM BY MIXING THE FEED WATER STREAM WITH A HEATING MEDIUM

BACKGROUND

This disclosure is in the field of desalination processes and, more particularly, desalination processes that do not rely upon a heat exchanging surface or pretreatment to meet feed water specifications.

Current desalination processes are complicated, expensive, and typically require extensive water pretreatment to ensure the proper quality of the boiler feed water. In some cases, the cost of pretreatment exceeds the cost of the actual boiling processes. U.S. Pat. No. 8,652,304 B2 ("Nazzer") discloses a method of extracting dissolved or undissolved solids from a mixture of water and a process liquid or stream. The mixture is introduced into a mixing zone within or upstream of a separation vessel where it is further mixed with a recycle fluid extracted from a liquid pool zone of the separator vessel and pumped through a heat exchanger.

Vaporization occurs in this mixing zone (where more than 99% of the volatile components of the feed stream are vaporized). The resulting stream is then transferred to the separator vessel in which the vapor is separated, with the solid and liquid components falling into the liquid pool zone of the separator vessel. A portion of these solids and liquids that bond to these solids then passes through a stripping zone of the separator vessel. Water residing within the stripping zone displaces the liquids bound to the solids and an aqueous waste stream with dissolved or nondissolved solids results.

Because this method requires a mixing zone for vaporization outside of the liquid pool, the required equipment is difficult to design and prone to scaling and plugging. The method also does not allow for vaporization within the liquid pool and requires the heating medium—i.e., the recycle fluid, immiscible with the process stream and lighter than the water in the stripping zone—to be recycled at a rate of at least ten times that of the process feed rate. This high recycle rate is required because the method must limit the temperature difference between the recycle fluid and the feed water stream in order to avoid thermal degradation effects.

Last, the method requires a stripping zone for solids removal. A stripping zone is prone to corrosion because of unvaporized (solids) components from the feed water stream. The stripping zone also presents safety concerns due to the risk of higher temperature oil contacting water. To reduce the safety concern, the oil must be cooled before it touches the water in the stripping zone, but cooling the oil increases its viscosity and ineffective solids separation results.

SUMMARY

The present disclosure simplifies the system and method of desalinating a feed water stream and reduces the cost of doing so.

Vaporization in a mixing zone outside of the liquid pool does not occur in embodiments of the system and method, nor do the system and method have a stripping zone for solids removal. The system and method is not limited to a light heating medium relative to the feed water stream but does have, in the case of a liquid containing a blowdown, a heating medium that is immiscible with the process stream to enable liquid separation. Any pre-mixing of the feed water stream and heating medium may be done at a level below that required for vaporization (or partial vaporization) of the feed water stream. Pre-mixing may also be done to provide a relatively small amount of vaporization to enhance the pre-mixing and accelerate the fluid when it enters the liquid pool.

Embodiments of the system and method may disperse the feed water stream into a liquid pool containing a hot heating medium that is less volatile than the feed water stream. To keep the pool hot, the heating medium can be recirculated through a heater in a pump-around loop. Alternatively or additionally, a heater can be placed in the liquid pool.

As the feed water stream is vaporized, any dissolved or undissolved solids present in the feed water stream come out of the stream together with the unvaporized feed water (in partial vaporization) and move into the heating medium. The solids and unvaporized feed water that move into the heating medium may be further removed from the heating medium within the vessel or in a separator located in the pump-around loop. If the removal of the solids and unvaporized feed water occurs within the vessel, the vessel should include internals of a kind known in the art to separate the unvaporized portion of the feed water stream from the heating medium. If the removal of the solids and unvaporized feed water occurs in a separator in the pump-around loop, the separator can be a hydrocyclone, centrifuge, particulate filter, settling tank, or some other piece of separation device equivalent to these, or a combination of these.

The vaporized feed water stream, i.e. steam, is compressed and condensed. The latent heat recovered during condensing is used to heat the heating medium as it recirculates in the pump-around loop. The condensed water is the desalinated water. The sensible heat in the condensed water can be further recovered by preheating the feed water. A secondary heater can be used in the pump-around loop to compensate the heat loss.

Unlike prior art systems and methods, there is no requirement for pretreatment of the feed water stream or low temperature differentials between the vaporization temperature of the stream and heating medium (e.g., limited to 10° C. above the vaporization temperature due to the risk of scaling in the heat exchanger in the pump-around loop).

The embodiments of this disclosure may simplify the system and method to desalinate a feed water stream; reduce the costs associated with prior art desalination processes; and eliminate the design and operational challenges presented by mixing zones located outside of the liquid pool zone of the vessel and stripping zones for solids removal. The disclosure eliminates the need for light heating mediums relative to the feed water stream and, in the case of total vaporization with a blowdown which contains the dissolved and undissolved solids portion of the feed water, eliminates the need for immiscible heating mediums. The disclosure also does not require the low temperature differential between the stream and heating medium or recycle rates of at least 10 times greater than that of the process feed.

The disclosure also reduces, and potentially eliminates, pretreatment for the feed water stream while at the same time minimizing or eliminating scaling and fouling of equipment. Because no heat exchanging surface is used directly in boiling, the disclosure can accommodate a wider range of feed water quality, thereby reducing the specifications for the feed water and allowing a much greater choice for the source of the feed water. Any pre-mixing of the feed water stream and the heating medium that occurs outside of the liquid pool zone may be done at a level below that at which the water vaporizes. Pre-mixing may also be done to provide a relatively small amount of vaporization to enhance the pre-mixing and accelerate the fluid when it enters the liquid pool.

BRIEF DESCRIPTION OF THE DRAWINGS

So that the above recited features can be understood in detail, a more particular description may be had by reference to embodiments, some of which are illustrated in the appended drawings, wherein like reference numerals denote like elements. It is to be noted, however, that the appended drawings illustrate various embodiments and are therefore not to be considered limiting of its scope, and may admit to other equally effective embodiments.

ELEMENTS AND NUMBERING USED IN THE DRAWINGS AND DETAILED DESCRIPTION

Figure 1:
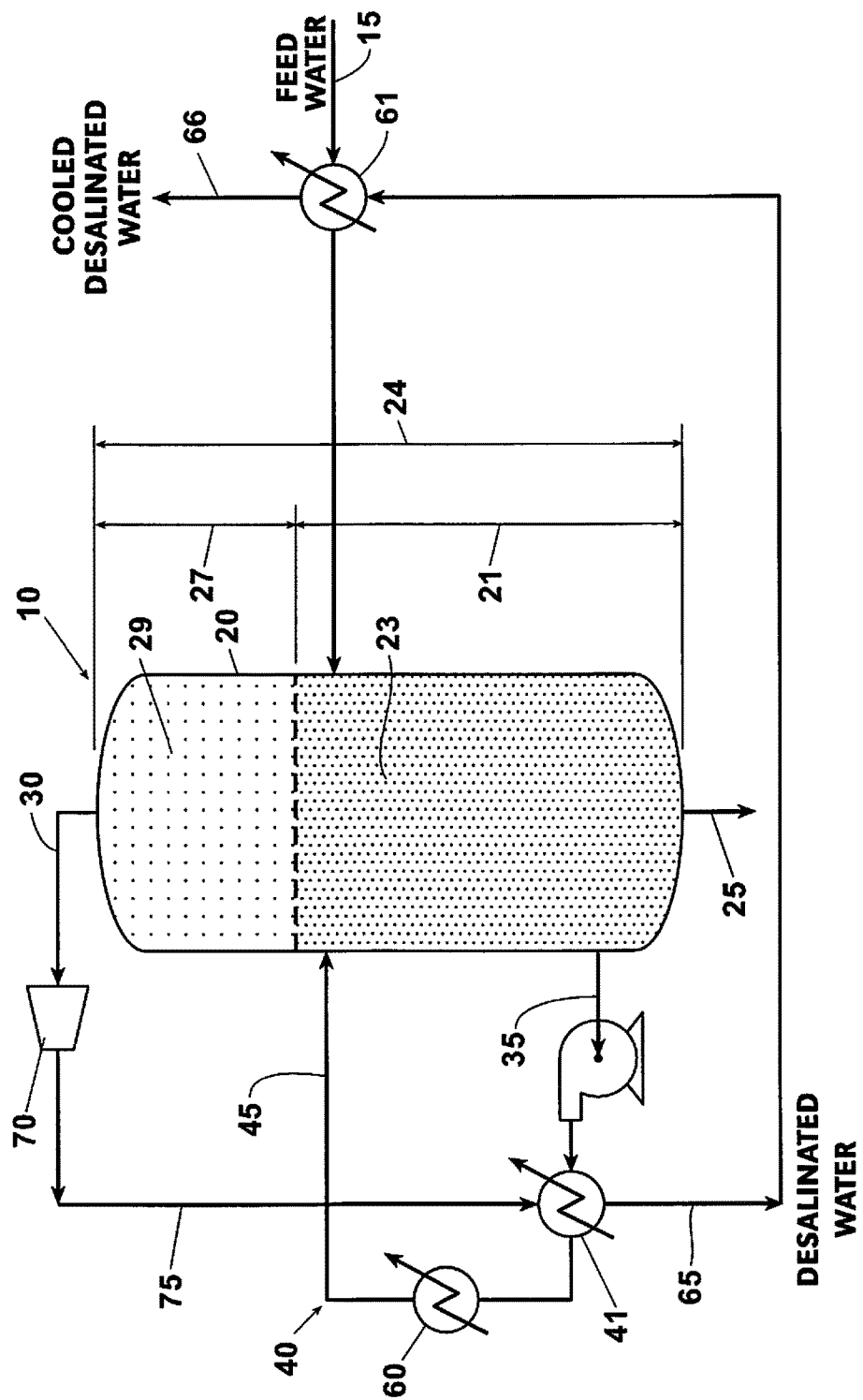
FIG. 1 is a schematic of an embodiment of a system and method to desalinate a feed water stream. The feed water stream is routed to a heating medium pool of a vessel. Steam is generated as the water of the feed water stream mixes with the heating medium and vaporizes or partially vaporizes. As the feed water vaporizes and turns into steam, dissolved solids may turn to undissolved solids. Undissolved solids along with unvaporized water (if any) move into the heating medium. The vessel includes internals to allow the separation of the solids and unvaporized water (if any) from the heating medium and remove the solids and unvaporized water (if any) from the vessel. A pump-around loop recycles the heating medium and any unvaporized portion of the feed water stream. The vaporized water stream is compressed and the heating medium can be reheated by condensing the pressurized stream in the pump-around loop. A secondary heater can be used to compensate any heat loss. The condensed water can be used to preheat the feed water to further cover the heat. If any pre-mixing of the feed water and heating medium occurs outside of the liquid pool (see FIG. 3), the pre-mixing may be at a level below that at which vaporization occurs. Pre-mixing may also be done to provide a relatively small amount of vaporization to enhance the pre-mixing and accelerate the fluid when it enters the liquid pool.

10 System or method
15 Feed water stream
17 Mixer within or outside of 20
20 Vessel
21 Liquid pool zone
23 Heating medium
24 Interior volume
25 Unvaporized (dissolved and undissolved solids and any unvaporized water) portion of 15
27 Vapor separation zone
29 Vaporized portion of 15
30 Steam
35 Removed heating medium stream or mixture (heating medium 23 and portion of 25)
40 Pump-around loop
41 Heating medium heater/steam condenser
45 Heated recycle stream substantially unvaporized portion-free or with a reduced unvaporized portion 25
47 Separator or separation device (such as a hydrocyclone, centrifuge, particulate filter, settling tank or their equivalents, or a combination of these)
50 Heating medium stream substantially unvaporized portion-free or with a reduced unvaporized portion 25
60 Secondary heater
61 Feed water preheater/desalinated water cooler
65 Condensed desalinated water stream
66 Cooled desalinated water
70 Compressor
75 Pressurized steam

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

In the specification and appended claims, the terms "connect", "connection", "connected", "in connection with", and "connecting" are used to mean "in direct connect with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream", "above" and "below", and other like terms indicated relative positions above or below a given point or element and are used in this description to more clearly describe some embodiments of the disclosure.

Embodiments of a system and method to desalinate a feed water stream eliminate the vaporization on the heat exchanging surface that drives existing feed water specifications. Therefore, a much wider choice for the source of (lower quality) feed water with very little or no pretreatment is allowed, including produced water and seawater sources.

The embodiments desalinate the feed water stream through vaporization (or partial vaporization) of the feed water stream when the stream contacts a heating medium residing in a liquid pool zone of a vessel. The vessel is arranged to directly receive the feed water stream, thereby eliminating pre-treatment between it and the upstream process providing the stream. A pump-around loop heats a portion of the heating medium and recycles this heated portion back to the vessel.

The heating medium, which can be lighter or heavier than the stream, is maintained at an operating temperature required for the desired vaporization (and desalination) effects. If any pre-mixing of the feed water and heating medium occurs outside of the liquid pool, the pre-mixing may be at a level below that at which vaporization occurs. Pre-mixing may also be done to provide a relatively small amount of vaporization to enhance the pre-mixing and accelerate the fluid when it enters the liquid pool. The vessel can also make use of blowdown to remove solids formed during the vaporization of the feed water stream. Blowdown, as used here, refers to the removal of solids or unvaporized feed water stream with concentrated levels of dissolved or undissolved solids. A separator located in the pump-around loop can be used for the separation of the blowdown.

Figure 2:
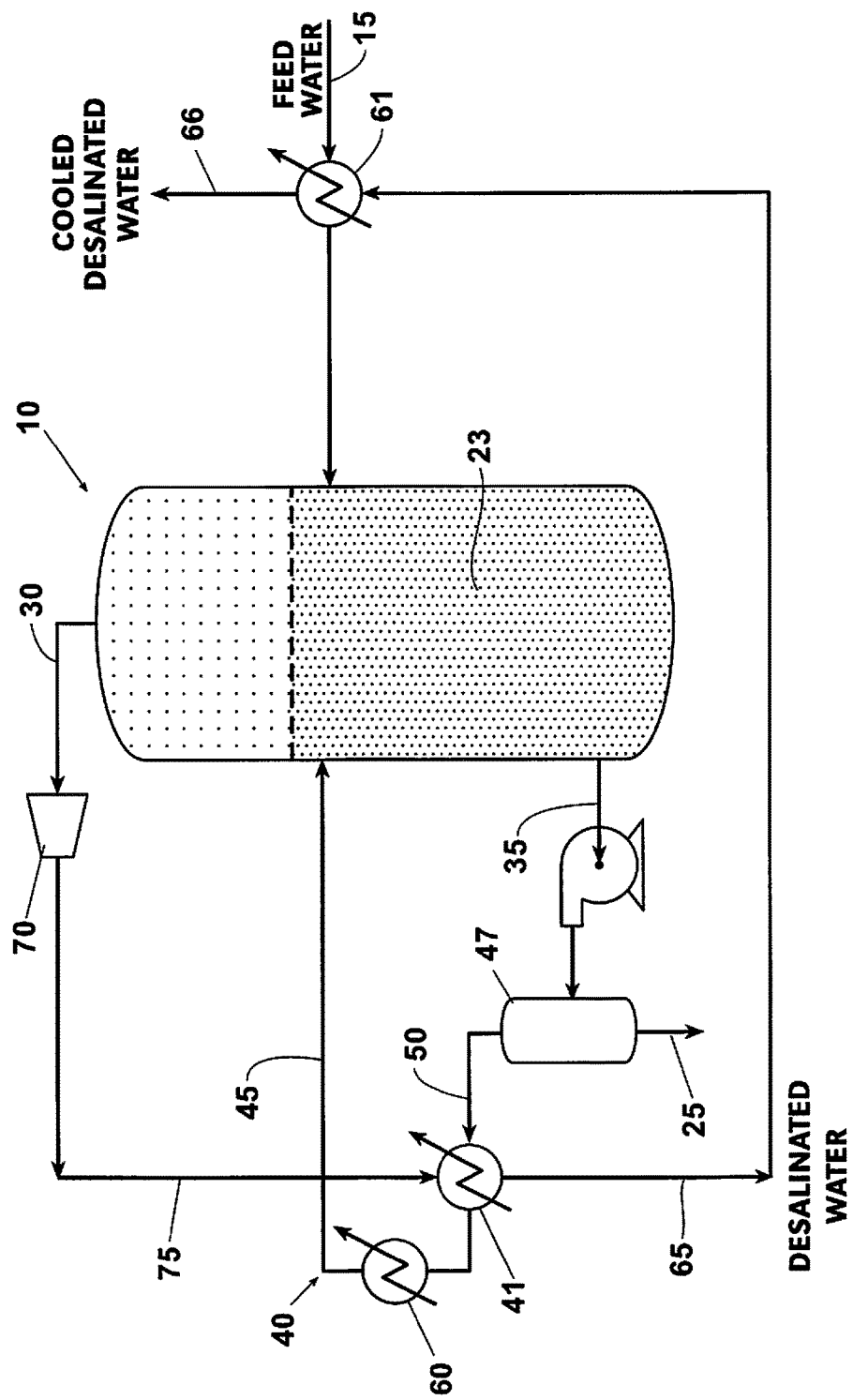
FIG. 2 is an embodiment of the system and method to desalinate a feed water stream. The pump-around loop includes a separator for removing solids alone or in combination with any unvaporized feed water. The separator can be a hydrocyclone, centrifuge, particulate filter, settling tank, or some other piece of separation device equivalent to these, or a combination of these.
Figure 3:
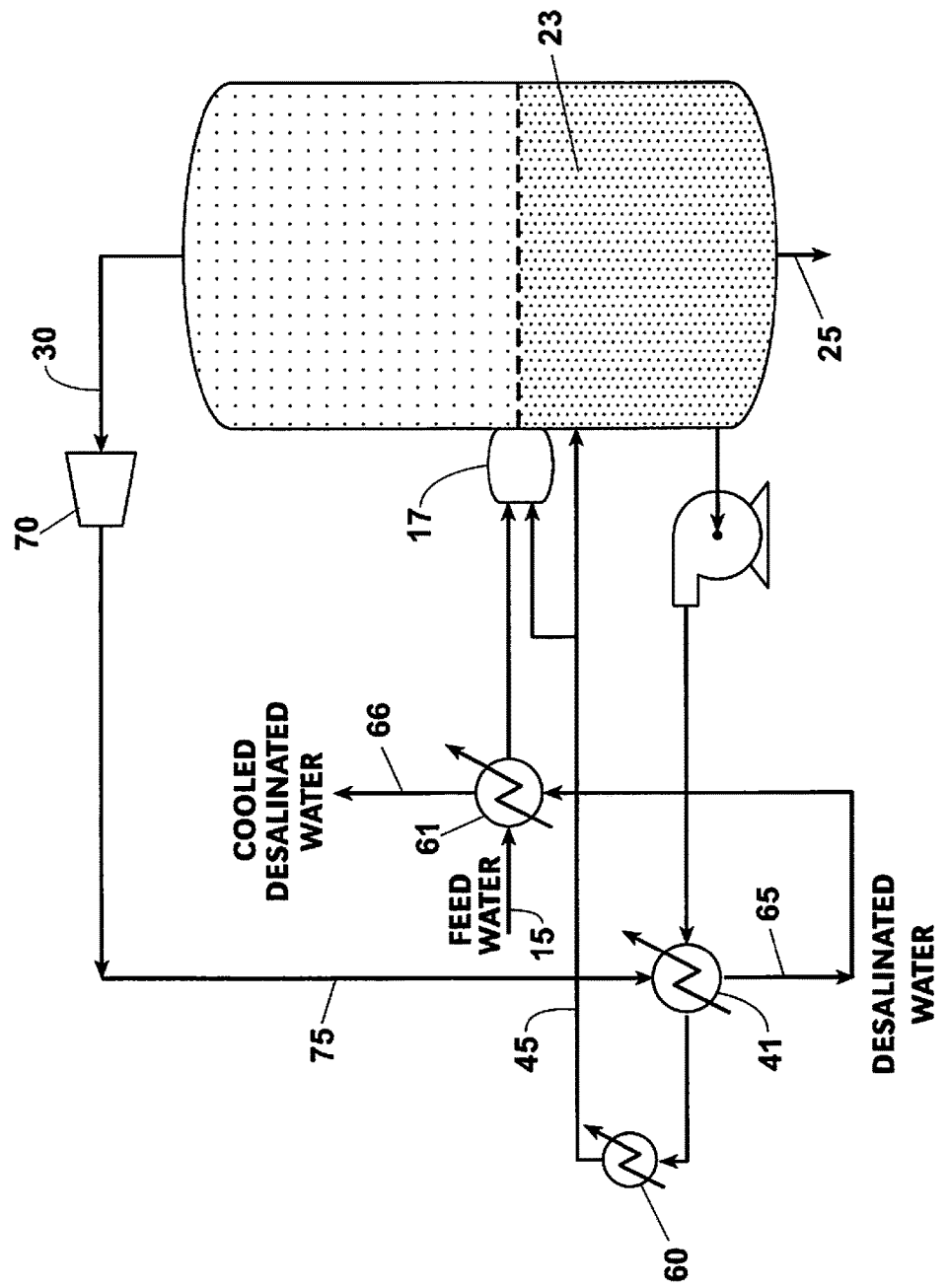
FIG. 3 is an embodiment of the system and method to desalinate a feed water stream. Pre-mixing of the feed water stream and heating medium occurs outside of the liquid pool zone of the vessel but at a level below that needed for vaporization. Pre-mixing may also be done to provide a relatively small amount of vaporization to enhance the pre-mixing and accelerate the fluid when it enters the liquid pool.

The different arrangements of the system and method 10 as shown in FIGS. 1 to 3 route a feed water stream 15 into a vessel 20 whose interior volume 24 is defined by a liquid pool zone 21 and a vapor separation zone 27. A heating medium 23 resides within the liquid pool zone 21 and this heating medium 23 is used to vaporize or partially vaporize the volatile components 29 of the feed water stream 15. Mixing of the feed water stream 15 and heating medium 23 occurs naturally within the liquid pool zone 21 as the feed water stream 15 enters the zone 21.

The now vaporized portions 29 of the feed water stream 15 migrate to a vapor separation zone 27 of the vessel 20 and are removed as a vaporized feed water stream 30 in the form of steam. The steam 30 is routed to a compressor 70 and the pressurized steam 75 is routed to a heating medium heater/steam condenser 41 to produce a condensed desalinated water stream 65. Heat from the heating medium heater/steam condenser 41 can be recovered and used to raise the temperature of the recycle stream 45.

As the volatile components 29 of the feed water stream 15 vaporize, the unvaporized portion 25 of the feed water stream 15 moves into the liquid pool zone 21 along with the heating medium 23. Because the unvaporized portion 25 is solids, or if any liquid, immiscible with the heating medium 23, that portion 25 can separate from the heating medium 23 either within the vessel 20 or within a separator 47 located in the pump-around loop 40. The unvaporized portion 25, both liquid and undissolved solids, can be removed as blowdown stream 25. No stripping zone is used.

The separator 47 used in the pump-around loop 40 can be any separator suitable, including but not limited to a hydrocyclone, centrifuge, particulate filter, settling tank, or some other piece of separation device equivalent to these, or a combination of these. A heating medium stream 50 with reduced amounts of, or without, unvaporized solids and liquids 25 exits the separator 47. Heat recovered from condensing the steam is used to raise the temperature of the recycle stream 45. A secondary heater 60 can be used to provide additional heat. The heated recycle stream 45 then recycles back to the liquid pool zone 21 of the vessel 20. The heated recycle stream 45 may include some unvaporized portion 25 of the feed water stream 15. A feed water preheater 61 can be used to preheat the feed water to recover the residual heat in the condensed desalinated water.

The heating medium 23 is maintained at an operating temperature that provides the desired vaporization effects. The heating medium 23 can be any heating medium depending on the make-up of feed water stream 15 and application-specific requirements. For example, the heating medium 23 could be one that one that is lighter than, heavier than, or (in the case of total vaporization of the water) the same density as the feed water stream 15. The heating medium 23 could also be one that forms, in the case of total vaporization, a homogeneous or heterogeneous mixture with the feed water stream 15. However, in the case of partial vaporization in which there is unvaporized water in the unvaporized portion 25, the heating medium 23 is immiscible with the feed water stream 15 to form a heterogeneous mixture. In either case, the heating medium 23 is less volatile than the volatile components 29 of the feed water stream 15.

To keep the heating medium 23 at the selected operating temperature, a heater (not shown) can be placed in the liquid pool zone 21. Alternatively or additionally, a removed stream 35 of the heating medium 23, which may include unvaporized portion 25 residing within the liquid pool zone 21, can be removed from the vessel 20 and routed to the pump-around loop 40 and its heating medium heater/steam condenser 41 and secondary heater 60. A heated recycle stream 45, which may include solids and unvaporized water from 25, then recycles back to the liquid pool zone 21.

An embodiment of a method to desalinate a feed water stream includes:

routing the feed water stream 15 into the liquid pool zone 21 of the vessel 20 where it becomes mixed with a heating medium 23 that is less volatile than the feed water stream 15 and maintained at an operating temperature determined by vaporization requirements to vaporize a volatile components portion 29 of the feed water stream 15;

removing the vaporized portion 29 of the feed water stream 15 from the vapor separation zone 27 of the vessel 20 as steam 30;

compressing at least a portion of the steam 30; and condensing at least of portion of the compressed steam 75. Condensing can take placed in the pump-around loop 40. Heat recovered from the heating medium heater/steam condenser 41 can be used as pre-heating to raise the temperature of the recycle stream 45.

Prior to the feed water stream 15 entering the liquid pool zone 21 there may be no pre-treatment of the stream 15 as it exits the upstream process providing the stream 15 and there may be no mixing of the feed water stream 15 with the heating medium 23. Pretreatment means treatment such as but not limited to chemical dosing, filtration using selectively permeable membranes, separators, or the use of ion exchange, deaerators or blowdown prior to the feed water stream 15 entering vessel 20 (or some combination of the above pretreatment methods). (Coarse straining of a kind known in the art and typically done ahead of pretreatment might be used if the feed is taken directly from a natural body of water or from a source with excessive undissolved solids.) If any pre-mixing of the feed water stream 15 and heating medium 23 occurs outside of the liquid pool zone 21 (see e.g. mixer 17 in FIG. 3), the pre-mixing may be done at a level below that at which vaporization occurs. Therefore, vaporization of the feed water stream 15 occurs within the liquid pool zone 21 of the vessel 20.

Pre-mixing may also be done to provide a relatively small amount of vaporization to enhance the pre-mixing and accelerate the fluid 15 when it enters the liquid pool 21. The amount of vaporization that occurs may be less than that which occurs in the liquid pool 21. For example, during normal (non-turndown) operations no more than about 20% or about 5% of the volatile components in the stream 15 may vaporize during pre-mixing. If the amount of vaporization does exceed that of the liquid pool, during normal operations vaporization during pre-mixing should not exceed about 80% or about 90% of the volatile components. Limiting the amount of vaporization during pre-mixing helps avoid the design challenges and scaling and plugging problems associated with the mixing zone of the prior art (see Background).

The heating medium 23 and feed water stream 15 can form a heterogeneous or homogeneous mixture (in the case of total or partial vaporization of water) or a heterogeneous mixture (in the case of partial vaporization of water) when residing within the liquid pool zone 21. Additionally, the density of the heating medium 23 can be greater than, less than, or (in the case of total vaporization) equal to that of the feed water stream 15.

The method can also include removing a portion 35 of the heating medium 23 residing in the liquid pool zone 21 of the vessel 20; raising a temperature of the removed portion or stream 35 to produce a heated recycle stream 45; and routing the heated recycle stream 45 back to the liquid pool zone 21. The removed stream 35 can also be routed to a separator 47 to produce a heating medium stream 50 substantially unvaporized portion-free or with a reduced unvaporized portion 25. Once stream 50 is heated (by heating medium heater/steam condenser 41 and secondary heater 60 arranged to transfer heat to the stream 50), it can be returned to the liquid pool zone 21 as the heated recycled stream 45.

An embodiment of a system to desalinate a feed water stream includes a vessel 20 arranged to contact a feed water stream 15 exiting an upstream process and route the feed water stream 15 into a heating medium 23 residing within the liquid pool zone 21 of the vessel 20. The interior volume 24 of the vessel 20 does not include a stripping zone for the removal of unvaporized portion 25. The heating medium 23 is less volatile than the feed water stream 15 and maintained at an operating temperature determined by vaporization requirements. The partially vaporized volatile components 29 of the feed water stream 15 migrate to the vapor separation zone 27 of the vessel 20.

A pump-around loop 40 is arranged to receive a portion 35 of the mixed heating medium 23 along with the non-volatile (dissolved and undissolved) and unvaporized water 25 of the feed water stream 15 that have moved into the heating medium 23 and then return the portion 35 back to the liquid pool zone 21 as a heated recycle stream 45. The pump-around loop 40 of the system can also include a heating medium heater/steam condenser 41 and secondary heater 60, as well as a separator 47 arranged upstream of the heating medium heater/steam condenser 41, so that a substantially unvaporized portion-free or reduced unvaporized portion heating medium stream 45 is being returned to the vessel 20.

Prior to contacting the heating medium 23, the feed water stream 15 may not be mixed with the heating medium 23 outside of the liquid pool zone 21 of the vessel 20. If any pre-mixing of the stream 15 and heating medium 23 occurs, the mixing may be at a level below that required for vaporization of the volatile components 29. Pre-mixing may also be done to provide a relatively small amount of vaporization to enhance the pre-mixing and accelerate the fluid when it enters the liquid pool 21.

The system includes a compressor 70 arranged to receive at least a portion of the steam 30. The system also includes a heating medium heater/steam condenser 41 arranged to receive at least a portion of the steam 30 exiting the vapor separation zone 27 of the vessel 20. Heat recovered from condensing the pressurized stream 75 can be used in the pump-around loop 40 to raise the temperature of the recycle stream 45.

Although the preceding description has been described herein with reference to particular means, materials, and embodiments, it is not intended to be limited to the particulars disclosed herein; rather, it extends to all functionally equivalent structures, methods, and uses, such as are within the scope of the appended claims.

What is claimed is:

1. A method to desalinate a feed water stream, the method comprising:

routing the feed water stream into a liquid pool zone of a vessel, the liquid pool zone including a heating medium, the heating medium being less volatile than the feed water stream and maintained at an operating temperature determined by vaporization requirements;

routing a portion of the heating medium from the liquid pool zone of the vessel to a heater;

raising a temperature of the removed portion in the heater to produce a heated recycle stream;

routing the heated recycle stream back to the liquid pool zone;

vaporizing at least a portion of volatile components of the feed water stream due to contact with the heating medium in the liquid pool zone; and removing a vaporized portion of the feed water stream from a vapor separation zone of the vessel as steam;

compressing the steam;

condensing at least a portion of the steam; and removing solids from the portion of the heating medium.

2. A method according to claim 1 further comprising pre-mixing the feed water stream and the heating medium outside of the liquid pool zone of the vessel.

3. A method according to claim 2 wherein during pre-mixing no vaporization of the volatile components of the feed water stream occurs.

4. A method according to claim 2 wherein during pre-mixing no more than about 90% of the volatile components of the feed water stream vaporize.

5. A method according to claim 1 further comprising separating and removing at least some of the solids from the vessel directly as blowdown.

6. A method according to claim 1 wherein the removed portion of the heating medium is a mixture of heating medium and at least some of the solids of the feed water stream.

7. A method according to claim 6 further comprising separating and removing at least some of the solids from the mixture prior to raising the temperature of the removed portion.

8. A method according to claim 1 wherein a density of the heating medium is greater than that of the feed water stream.

9. A method according to claim 1 wherein the heating medium is immiscible with the feed water stream.

10. A method according to claim 1 wherein there is no pre-treatment of the feed water stream prior to entering the liquid pool zone of the vessel.

11. A method according to claim 1 further comprising filtering the feed water stream by straining prior to the feed water stream entering the liquid pool zone of the vessel.

12. A method according to claim 1 further comprising recovering residual heat in the condensed steam.

13. A method according to claim 1 further comprising preheating the feed water stream.

14. The method of claim 1, wherein the steam is condensed using the heater.

15. A system to desalinate a feed water stream, the system comprising:

a vessel arranged to contact the feed water stream and route the feed water stream into a liquid pool zone of the vessel, the liquid pool zone including a heating medium less volatile than the feed water stream and maintained at an operating temperature determined by vaporization requirements;

a pump-around loop arranged to route a portion of the heating medium residing in the liquid pool zone to a condenser to heat the portion to the operating temperature and return the portion back to the liquid pool zone; and a compressor arranged to receive at least a portion of the steam exiting the vapor separation zone of the vessel and produce a pressurized steam, wherein the condenser is arranged to receive at least a portion of the pressurized steam wherein when the feed water stream is contacted by the heating medium in the liquid pool zone at least a portion of volatile components of the feed water stream vaporize and migrate to a vapor separation zone of the vessel for removal and solids form in the liquid pool zone of the vessel for removal.

16. A system according to claim 15 further comprising a mixer located outside of the liquid pool zone of the vessel and arranged to mix the feed water stream and the portion of the heating medium being returned to the vessel.

17. A system according to claim 16 wherein the mixer is arranged so no vaporization of the volatile components of the feed water stream occurs in the mixer.

18. A system according to claim 16 wherein the mixer is arranged so no more than about 90% of the volatile components of the feed water stream vaporize in the mixer.

19. A system according to claim 15 wherein the vessel includes internals arranged to separate at least a portion of the solids from the heating medium.

20. A system according to claim 15 further comprising the pump-around loop including a separation device.

21. A system according to claim 15 further comprising a preheater to heat the feed water stream.

22. A method to desalinate a feed water stream, the method comprising:

routing the feed water stream into a liquid pool zone of a vessel, the liquid pool zone including a heating medium, the heating medium being less volatile than the feed water stream and maintained at an operating temperature determined by vaporization requirements;

routing a portion of the heating medium from the liquid pool zone of the vessel to a first heater;

routing the portion of the heating medium from the first heater to a second heater;

raising a temperature of the removed portion in the first and second heaters to produce a heated recycle stream;

routing the heated recycle stream back to the liquid pool zone;

vaporizing at least a portion of volatile components of the feed water stream due to contact with the heating medium in the liquid pool zone; and removing a vaporized portion of the feed water stream from a vapor separation zone of the vessel as steam;

compressing at least a portion of the steam;

condensing at least a portion of the steam; and removing solids from the portion of the heating medium.

23. The method of claim 22, wherein the condensing at least a portion of the steam is performed using the first heater.

* * * * *